(12) United States Patent
Chiang et al.

(10) Patent No.: US 7,170,017 B2
(45) Date of Patent: Jan. 30, 2007

(54) COORDINATE DETECTING METHOD AND SYSTEM FOR TOUCH PANEL

(75) Inventors: Wu-Chung Chiang, Taichung (TW); Ching-Haur Chang, Taichung (TW); Chen Kun Kuo, Taichung (TW); Pei Cheng Lee, Taichung (TW)

(73) Assignee: Honour International Co., Ltd., Belize City (BZ)

( * ) Notice: Subject to any disclaimer, the term of this patent is extended or adjusted under 35 U.S.C. 154(b) by 486 days.

(21) Appl. No.: 10/801,061

(22) Filed: Mar. 15, 2004

(65) Prior Publication Data

US 2005/0001811 A1    Jan. 6, 2005

(30) Foreign Application Priority Data

Mar. 14, 2003   (TW) .............................. 92105613 A

(51) Int. Cl.
*G09G 5/00*    (2006.01)
*G06K 11/06*   (2006.01)

(52) U.S. Cl. ................... 178/18.01; 345/173; 345/179; 178/20.01

(58) Field of Classification Search ........ 345/173–179; 178/18.01–18, 18.05, 19.01, 20
See application file for complete search history.

(56) References Cited

U.S. PATENT DOCUMENTS 5,374,787 A * 12/1994 Miller et al. ............. 178/18.06
5,783,951 A * 7/1998 Inoue et al. ................... 327/52
5,880,411 A * 3/1999 Gillespie et al. .......... 178/18.01
6,075,520 A * 6/2000 Inoue et al. ................. 345/173
6,118,084 A * 9/2000 Landmeier ............... 178/18.01
6,246,394 B1 * 6/2001 Kalthoff et al. ............. 345/173
6,255,604 B1 * 7/2001 Tokioka et al. .......... 178/18.01
6,610,936 B2 * 8/2003 Gillespie et al. ......... 178/18.01

* cited by examiner

Primary Examiner—Henry N. Tran
(74) Attorney, Agent, or Firm—Christensen O'Connor Johnson Kindness PLLC

(57) ABSTRACT

The invention relates to a coordinate detecting method for a touch panel. Firstly, a plurality of X-axis and Y-axis I/O ports are converted to a plurality of X-axis and Y-axis scanning wires respectively by orthogonal method. Polling signals are transmitted to X-axis I/O ports, and are transmitted to the X-axis scanning wires. According to the polling signals, a plurality of X-axis detection signals are stored. A largest X-axis detection signal and a second largest X-axis detection signal are determined by compared method so as to calculate a X coordinate position of the sensor pen touching the touch panel. The steps are repeated to calculate the Y coordinate position of the sensor pen touching on the touch panel. According to the coordinate detecting method of the invention, the number of the I/O ports can be reduced, and the resolution of the touch panel can be improved. For the calculation method, the invention utilizes simple compared method to obtain the largest detection signal and the second largest detection signal so as to calculate the coordinate position of the sensor pen touching on the touch panel. Therefore, the coordinate detecting method of the invention is very simple and rapid.

8 Claims, 6 Drawing Sheets

COORDINATE DETECTING METHOD AND SYSTEM FOR TOUCH PANEL

BACKGROUND OF THE INVENTION

1. Field of the Invention

The present invention relates to a coordinate detecting method and system, more particularly, to a coordinate detecting method and system for a touch panel.

2. Description of the Related Art

The conventional coordinate detecting methods for the touch panels include a touching matrix coordinate detecting method, a non-touching electrical field type or capacitive type coordinate detecting method and divided voltage type coordinate detecting method.

The touching matrix coordinate detecting method utilizes a controller having a plurality of I/O ports to form a plurality of X-axis and Y-axis scanning wires. The controller sends signals to the X-axis scanning wires, and reads signals from the Y-axis scanning wires so that a coordinate position touched by the user can be obtained. Because the method utilizes the I/O ports of the controller and the number of the I/O ports is limited, the number of the X-axis and Y-axis scanning wires cannot be increased and the resolution of the touch panel used in the method cannot be improved.

The non-touching electrical field type coordinate detecting method utilizes a controller having a plurality of I/O ports to form a plurality of X-axis and Y-axis scanning wires. A sensor pen is used to read detection signals and the coordinate position of the sensor pen can be calculated. In the method, the I/O ports of the controller are converted to X-axis and Y-axis scanning wires one after another, or one I/O port is converted to multiple X-axis (or Y-axis) scanning wires. For calculating the position of the pen, the controller must send signals (from level Low to level High) to I/O port according to clockwise and counter-clockwise directions respectively so as to precisely calculate the coordinate position.

In the method, the number of the I/O ports can be reduced by the one to multiple converting method. However, the signals must be sent according to clockwise and counter-clockwise directions respectively, then the sensor pen reads detection signals for those two signals. These two detection signals are in the form of voltage gradient, and compared each other in order to calculate the coordinate position. Although the voltage gradient is linear in theory, the voltage gradient is nonlinear in practice. A software program is needed to compensate the nonlinear portion of the voltage gradient. Therefore, the method for calculating the coordinate position is complex.

The divided voltage type coordinate detecting method utilizes a controller having a plurality of I/O ports to form a plurality of X-axis and Y-axis scanning wires. Each X-axis (or Y-axis) scanning wire is connected to a main line formed by the I/O ports. A divided voltage circuit is formed by utilizing the resistance of the main line. Using the method, the number of the X-axis and Y-axis scanning wires is not limited to the number of I/O ports. However, when the controller is powered on, the controller must calibrate the system to reduce the circumference and material interference in the main line. Similarly, the controller must send signals (from level Low to level High) to I/O port according to clockwise and counter-clockwise direction respectively so as to precisely calculate the coordinate position.

In the divided voltage type coordinate detecting method, the few I/O ports are used to form the main line, and the main line is divided into the X-axis and Y-axis scanning wires. However, to overcome the unstable characteristic of the resistance material and the difference in electrical field intensity between the branched nodes, the calculation method is very complex to obtain the coordinate position of the pen. The complexity of software for the divided voltage type coordinate detecting method is higher than that of the non-touching electrical field type coordinate detecting method.

In the above conventional method, the number of the I/O ports is in reverse proportion to the complexity for calculating the coordinate position of the sensor pen. That is, the more I/O ports the controller has, the simpler the calculation method is. The fewer I/O ports the controller has, the more complex the calculation method is.

Therefore, it is necessary to provide an innovative and progressive coordinate detecting method in order to solve the above problem.

SUMMARY OF THE INVENTION

One objective of the present invention is to provide a coordinate detecting method for a touch panel. The coordinate detecting method comprises the steps of: (a) converting a plurality of X-axis I/O ports and a plurality of Y-axis I/O ports respectively to form a plurality of X-axis scanning wires and a plurality of Y-axis canning wires of the touch panel by orthogonal method; (b) transmitting polling signals to the X-axis I/O ports in sequence, then polling signals transmitted to the X-axis scanning wires; (c) storing a plurality of X-axis detection signals from a sensor touching on the touch panel according to the polling signals; (d) determining a largest X-axis detection signal and a second largest X-axis detection signal, then determining an X coordinate position of the sensor on the touch panel; (e) transmitting polling signals to the Y-axis I/O ports in sequence, then polling signals transmitted to the Y-axis scanning wires; (f) storing a plurality of Y-axis detection signals from the sensor touching on the touch panel according to the polling signals; and (g) determining a largest Y-axis detection signal and a second largest Y-axis detection signal, then determining a Y coordinate position of the sensor on the touch panel.

According to the coordinate detecting method of the invention, the X-axis and Y-axis I/O ports are converted to X-axis and Y-axis scanning wires respectively by orthogonal method. The number of the I/O ports can be reduced, and the resolution of the touch panel can be improved. For the calculation method, the invention utilizes simple comparing method to obtain the largest detection signal and the second largest detection signal so as to calculate the coordinate position of the pen touching the touch panel. Therefore, the coordinate detecting method of the invention is very simple and rapid.

DETAILED DESCRIPTION OF THE INVENTION

Figure 1:
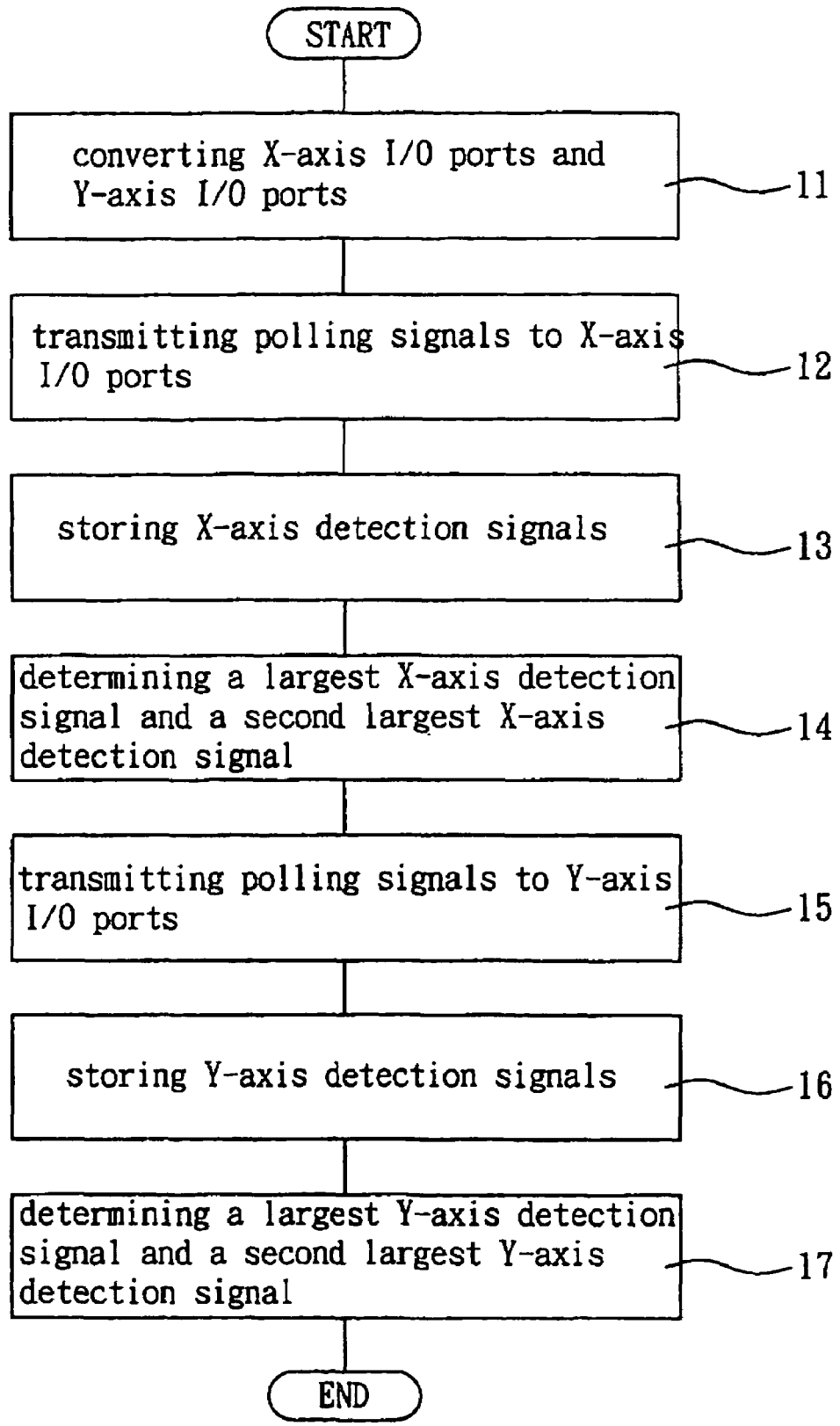
FIG. 1 shows a flow chart of a coordinate detecting method for a touch panel, according to the invention.
Figure 2:
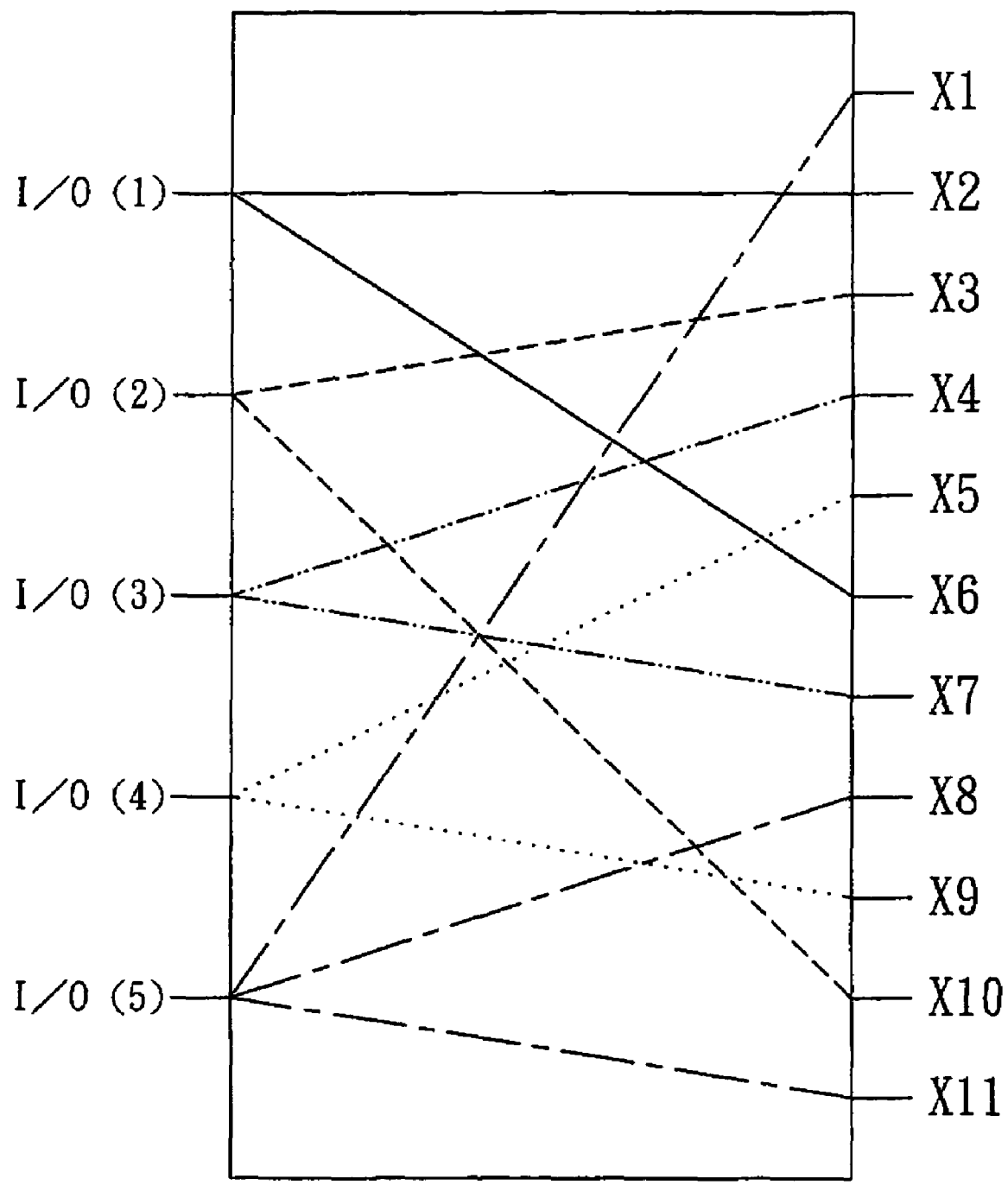
FIG. 2 illustrates that X-axis I/O ports are converted to X-axis scanning wires, according to an embodiment of the invention.

Referring to FIG. 1, in step 11, a plurality of X-axis I/O ports and a plurality of Y-axis I/O ports are converted respectively to form a plurality of X-axis scanning wires and a plurality of Y-axis canning wires of the touch panel by orthogonal method. Referring to FIG. 2, five X-axis I/O ports I/O(1), I/O(2), I/O(3), I/O(4) and I/O(5) are converted to eleven X-axis scanning wires (X1 to X11). I/O(1) is connected to X2 and X6 scanning wires. I/O(2) is connected to X3 and X10 scanning wires. I/O(3) is connected to X4 and X7 scanning wires. I/O(4) is connected to X5 and X9 scanning wires. I/O(5) is connected to X1, X8 and X11 scanning wires.

In the above converted method, the number of the I/O ports is lower than that of the scanning wires, and the arrangement of the scanning wires must obey the orthogonal method. That is, a scanning interval between two scanning wires is correlative to the unique I/O ports. For example, a scanning interval between X1 and X2 scanning wires is correlative to the unique I/O ports I/O(5) and I/O(1). There is no other scanning interval correlative to the unique I/O ports I/O(5) and I/O(1). This method is Group Arranged I/O technology.

According to the Group Arranged I/O technology, the number of X-axis I/O ports is N, and N is an odd number. The maximum number of the X-axis scanning wires is $C(N,2)+1$, and the maximum number of the scanning interval is $C(N,2)$. If N is an even number, the maximum number of the X-axis scanning wires is $C(N,2)-N/2+2$, and the maximum number of the scanning interval is $C(N,2)-N/2+1$. For example, if N=5, the maximum number of the X-axis scanning wires is $C(5,2)+1=11$, as shown in FIG. 2. If N=6, the maximum number of the X-axis scanning wires is $C(6,2)-6/3+2=14$.

Figure 3:
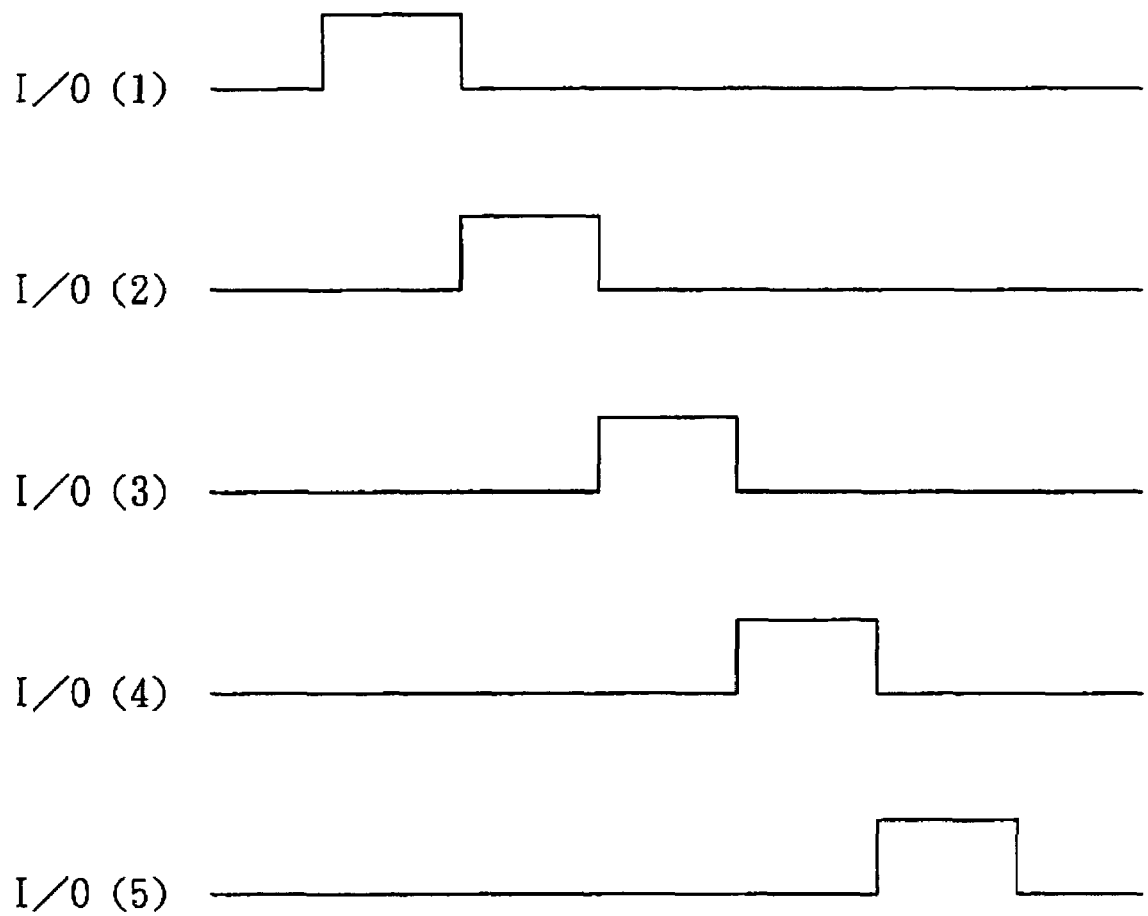
FIG. 3 illustrates polling signals transmitted to X-axis I/O ports, according to the embodiment of the invention.
Figure 4:
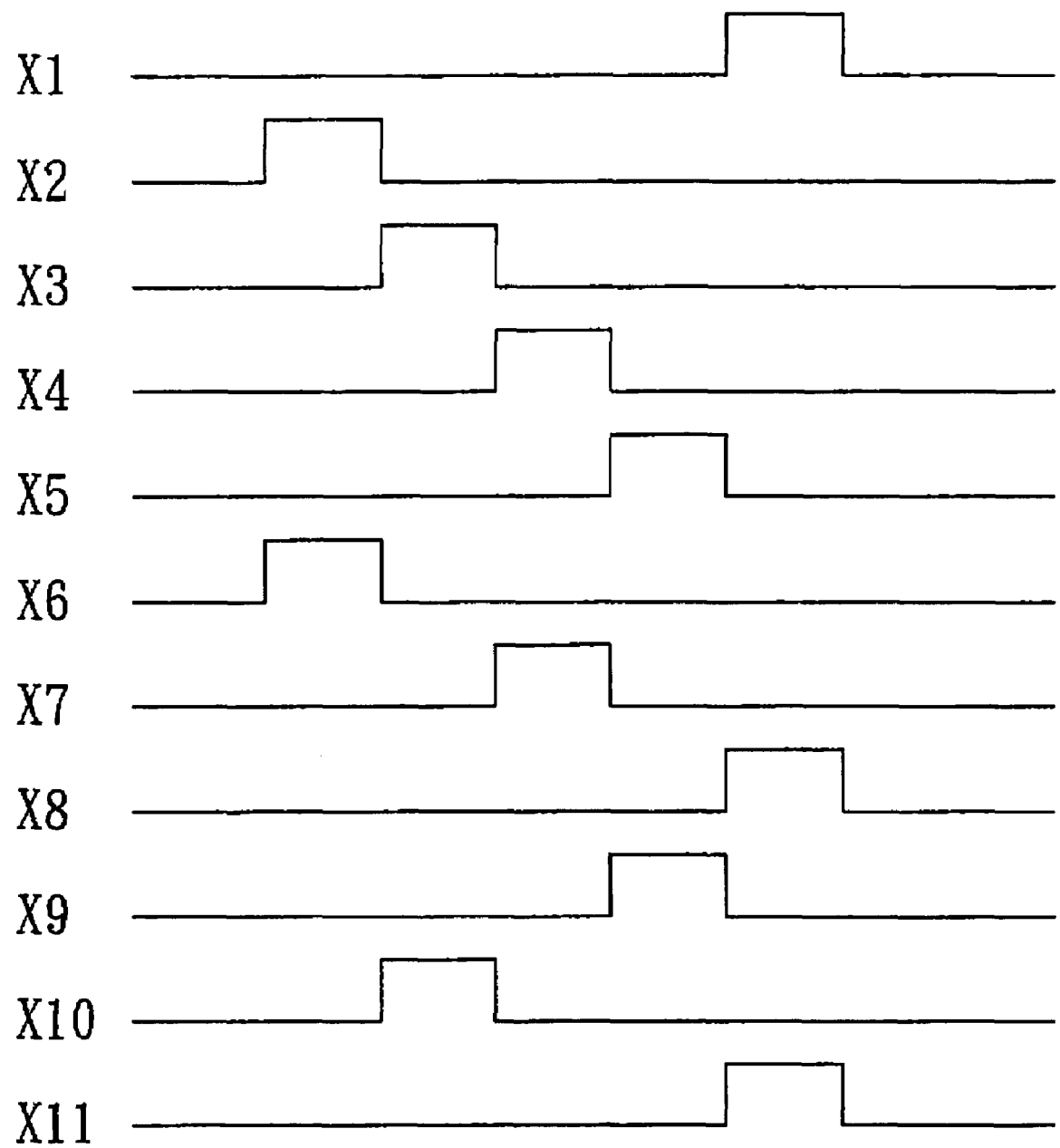
FIG. 4 illustrates polling signals transmitted to X-axis scanning wires, according to the embodiment of the invention.

In step 12, polling signals are transmitted to the X-axis I/O ports in sequence, and polling signals are transmitted to the X-axis scanning wires. Referring to FIG. 3 and FIG. 4, a square wave (polling signal) is transmitted to I/O(1) to I/O(5) in sequence, and the X-axis scanning wires have corresponding square wave. In other words, because I/O(1) is connected to X2 and X6 scanning wires, the X2 and X6 scanning wires have the square wave when I/O(1) receives square wave.

In step 13, according to the polling signals, a plurality of X-axis detection signals are stored. The X-axis detection signals come from a sensor pen touching on the touch panel. That is, when an I/O port sends out the polling signal, the sensor pen detects an X-axis detection signal. In the above embodiment, there are five X-axis I/O ports, and the polling signals are transmitted to the I/O ports in sequence. Therefore, the sensor pen will detect five X-axis detection signals corresponding to the polling signals.

In step 14, a largest X-axis detection signal and a second largest X-axis detection signal are determined by compared method so as to calculate the X coordinate position of the sensor pen touching the touch panel. An embodiment is described as below, if the sensor pen touches the coordinate position between the X8 and X9 scanning wires, and the coordinate position is near to the X9 scanning wires. When I/O(4) sends out the polling signal, the sensor pen detects a largest X-axis detection signal. When I/O(5) sends out the polling signal, the sensor pen detects a second largest X-axis detection signal. The reason is that the X8 scanning wire is connected to I/O(5) and the X9 scanning wire is connected to I/O(4). Therefore, according to the relation between X-axis I/O ports and X-axis scanning wires, and the polling signals, and the largest X-axis scanning wire and the second largest X-axis scanning wire from the sensor pen, the coordinate position of the sensor pen can be calculated at the coordinate position between X8 scanning wire and X9 scanning wire, and the coordinate position is near to X9 scanning wire.

Therefore, according to the above method of the invention, the X coordinate position of the sensor pen can be calculated easily and rapidly. The number of the I/O ports can be reduced, and the resolution of the touch panel can be improved.

The method for calculating Y coordinate position of the sensor pen is the same as that for calculating X coordinate position of the sensor pen. In step 15, the polling signals are transmitted to Y-axis I/O ports, and are transmitted to the Y-axis scanning wires. As shown in step 16, according to the polling signals, a plurality of Y-axis detection signals are stored. As shown in step 17, a largest Y-axis detection signal and a second largest Y-axis detection signal are determined by compared method so as to calculate the Y coordinate position of the sensor pen touching on the touch panel. Therefore, according to the above method of the invention, the Y coordinate position of the sensor pen can be calculated easily and rapidly. The X coordinate position and Y coordinate position of the sensor pen can be obtained by the above method.

According to the coordinate detecting method of the invention, the X-axis and Y-axis I/O ports are converted to X-axis and Y-axis scanning is wires respectively by orthogonal method. The number of the I/O ports can be reduced, and the resolution of the touch panel can be improved. For the calculation method, the invention utilizes simple determination method to obtain the largest detection signal and the second largest detection signal so as to calculate the coordinate position of the sensor pen touching on the touch panel. Therefore, the coordinate detecting method of the invention is very simple and rapid. The coordinate detecting method of the invention has both merit of reducing the number of I/O ports and merit of simple calculation method.

Figure 5:
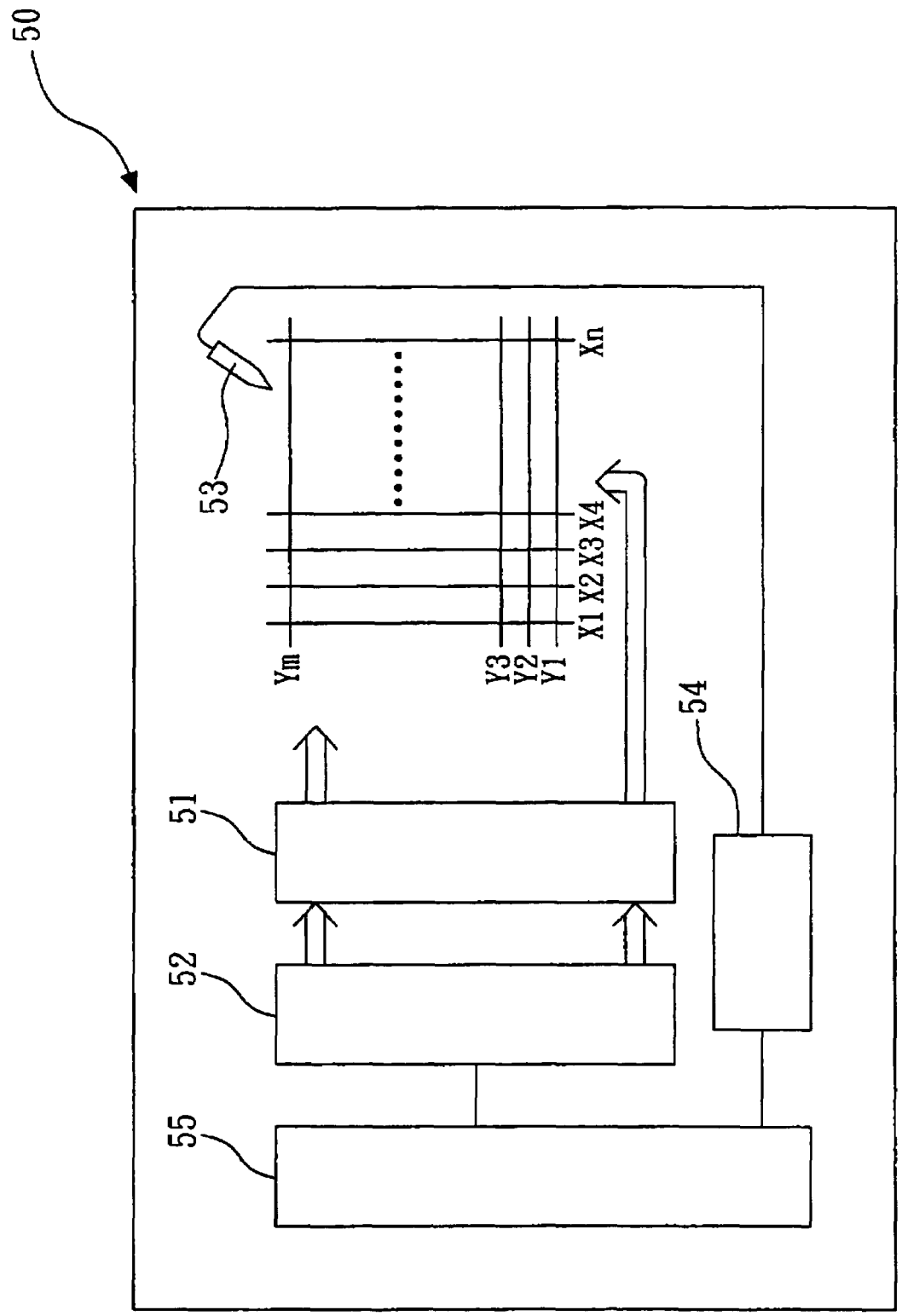
FIG. 5 shows a block diagram of a coordinate detecting system for a touch panel, according to the invention.

Referring FIG. 5, it shows a coordinate detecting method 50 for a touch panel, according to the invention. The coordinate detecting method 50 comprises a converting means 51, a control means 52, a sensor pen 53, a database 54 and an arithmetic means 55. The converting means 51 utilizes the orthogonal method to convert a plurality of X-axis I/O ports and a plurality of Y-axis I/O ports respectively to form a plurality of X-axis scanning wires (X1 to Xn) and a plurality of Y-axis canning wires (Y1 to Ym) of the touch panel. Referring to FIG. 2, it shows that five X-axis I/O ports I/O(1) to I/O(5) are converted to eleven X-axis scanning wires (X1 to X11). The X-axis scanning wires and Y-axis scanning wires are formed as the coordinate of the touch panel.

The control means 52 is used to transmit polling signals to the X-axis I/O ports and the Y-axis I/O ports in sequence, and the X-axis scanning wires and the Y-axis scanning wires receive the responding polling signals. Referring to FIG. 3 and FIG. 4, they show that a square wave (polling signal) is transmitted to I/O(1) to I/O(5) in sequence, and the X-axis scanning wires receive corresponding square wave.

Figure 6:
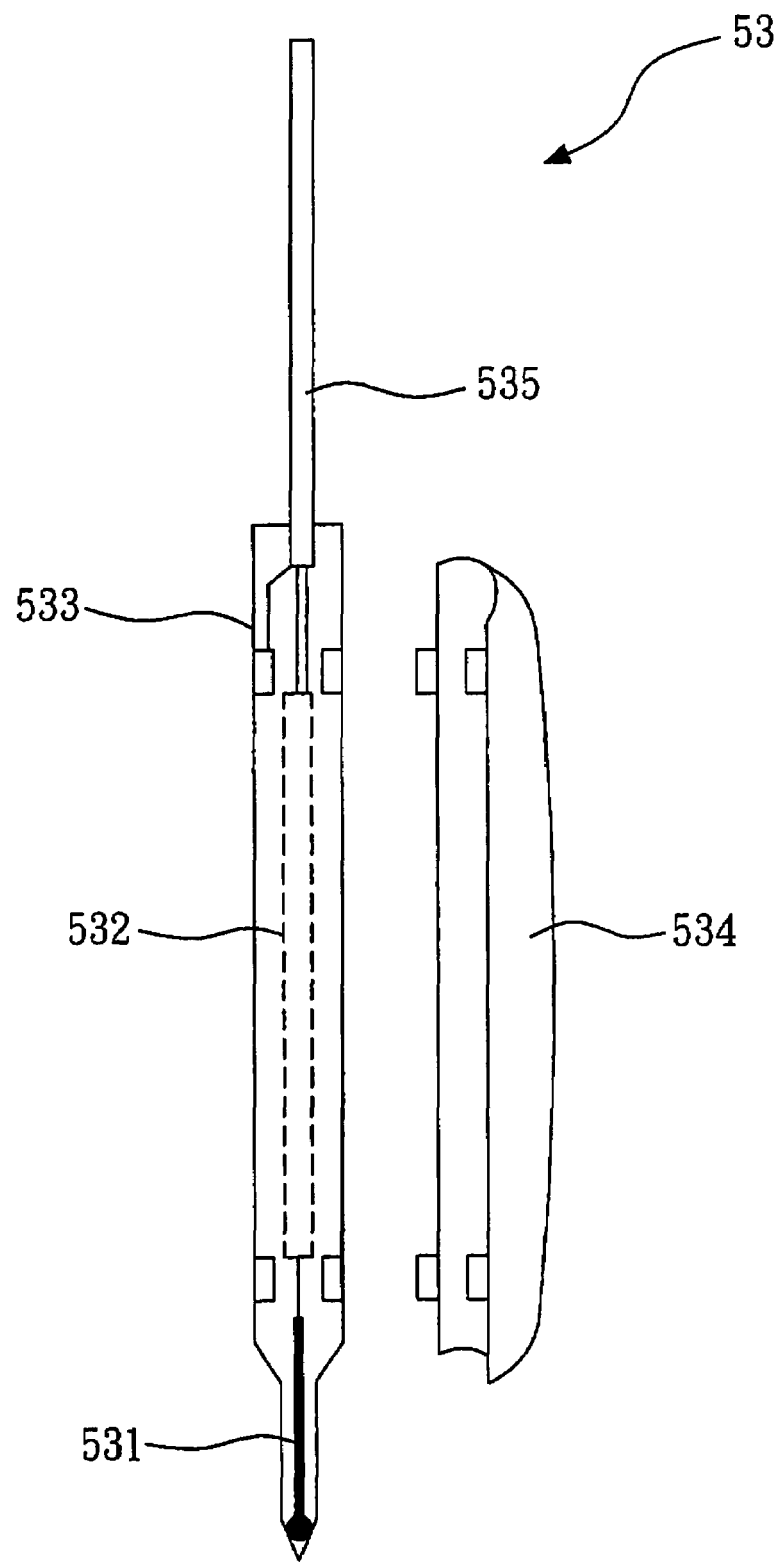
FIG. 6 shows a simplified diagram of a pen, according to the invention.

The sensor pen 53 is used for detecting a plurality of X-axis detection signals and a plurality of Y-axis detection signals according to the polling signals. Referring to FIG. 6, the sensor pen 53 comprises an antenna 531 and a demodulation circuit 532, a printed circuit board 533, a shielding housing 534 and a cable 535. A line on the printed circuit board 533 is taken as the antenna, and the antenna 531 is used for detecting the X-axis detection signals and the Y-axis detection signals, according to the polling signals. The X-axis detection signals and the Y-axis detection signals are transmitted to the demodulation circuit 532, and the demodulation circuit demodulates the X-axis detection signals and the Y-axis detection signals. Then, the demodulated X-axis detection signals and Y-axis detection signals are transmitted to the database 54 by the cable 535. The shielding housing 534 covers the demodulation circuit 532 to isolate the external noise. The shielding housing 535 is preferred to be in a circle form so as to facilitate the user holding the sensor.

The database 54 is used to store the X-axis detection signals and the Y-axis detection signals from the sensor pen 53. According to the embodiment shown in FIG. 3, there are five X-axis I/O ports, and the polling signals are transmitted to the I/O ports in sequence. The sensor pen 53 will detect five X-axis detection signals according to the polling signals, and the five X-axis detection signals are stored in the database 54.

The arithmetic means 55 is used to determine a largest X-axis detection signal and a second largest X-axis detection signal among the X-axis detection signals stored in the database 54, and a largest Y-axis detection signal and a second largest Y-axis detection signal among the Y-axis detection signals stored in the database 54. Then, according to the relation between I/O ports and scanning wires and the polling signals, an X coordinate position and a Y coordinate position of the sensor pen on the touch panel can be obtained.

While an embodiment of the present invention has been illustrated and described, various modifications and improvements can be made by those skilled in the art. The embodiment of the present invention is therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. A coordinate detecting method for a touch panel, comprising the steps of:
    (a) converting a plurality of X-axis I/O ports and a plurality of Y-axis I/O ports respectively to form a plurality of X-axis scanning wires and a plurality of Y-axis canning wires of the touch panel by an orthogonal method;
    (b) transmitting polling signals to the X-axis I/O ports in sequence, which are then transmitted to the X-axis scanning wires;
    (c) storing a plurality of X-axis detection signals from a sensor touching the touch panel according to the polling signals;
    (d) determining a largest X-axis detection signal and a second largest X-axis detection signal, then determining an X coordinate position of the sensor on the touch panel;
    (e) transmitting polling signals to the Y-axis I/O ports in sequence, which are then transmitted to the Y-axis scanning wires;
    (f) storing a plurality of Y-axis detection signals from the sensor touching the touch panel according to the polling signals; and
    (g) determining a largest Y-axis detection signal and a second largest Y-axis detection signal, then determining a Y coordinate position of the sensor on the touch panel.

2. The coordinate detecting method according to claim 1, wherein the number of X-axis I/O ports or the number of Y-axis I/O ports is an odd number N, and the maximum number of the X-axis scanning wires or the maximum number of the Y-axis scanning wires is $C(N,2)+1$.

3. The coordinate detecting method according to claim 1, wherein the number of X-axis I/O ports or the number of Y-axis I/O ports is an even number N, and the maximum number of the X-axis scanning wires or the maximum number of the Y-axis scanning wires is $C(N,2)-N/2+2$.

4. A coordinate detecting system for a touch panel comprising:
    a converting means for converting a plurality of X-axis I/O ports and a plurality of Y-axis I/O ports respectively to form a plurality of X-axis scanning wires and a plurality of Y-axis canning wires of the touch panel by orthogonal method;
    a control means for transmitting polling signals to the X-axis I/O ports and the Y-axis I/O ports in order, the X-axis scanning wires and the Y-axis scanning wires having the responding polling signals;
    a sensor for detecting a plurality of X-axis detection signals and a plurality of Y-axis detection signals according to the polling signals;
    a database for storing the X-axis detection signals and the Y-axis detection signals from the sensor; and
    an arithmetic means for determining a largest X-axis detection signal, a second largest X-axis detection signal, and determining a largest Y-axis detection signal and a second largest value Y-axis detection signal, then determining an X coordinate position and a Y coordinate position of the sensor on the touch panel.

5. The coordinate detecting system according to claim 4, wherein the number of X-axis I/O ports or the number of Y-axis I/O ports is an odd number N, and the maximum number of the X-axis scanning wires or the maximum number of the Y-axis scanning wires is $C(N,2)+1$.

6. The coordinate detecting system according to claim 4, wherein the number of X-axis I/O ports or the number of Y-axis I/O ports is an even number N, and the maximum number of the X-axis scanning wires or the maximum number of the Y-axis scanning wires is $C(N,2)-N/2+2$.

7. The coordinate detecting system according to claim 4, wherein the sensor comprises an antenna and a demodulation circuit, the antenna being used to detect the X-axis detection signals and the Y-axis detection signals, and the demodulation circuit being used to demodulate the X-axis detection signals and the Y-axis detection signals, and to transmit the X-axis detection signals and the Y-axis detection signals to the database.

8. The coordinate detecting system according to claim 7, wherein the sensor further comprises a shielding housing for covering the demodulation circuit to isolate the external noise.

* * * * *